(No Model.)
G. REIN.
SAFETY RAZOR.
No. 358,751. Patented Mar. 1, 1887.
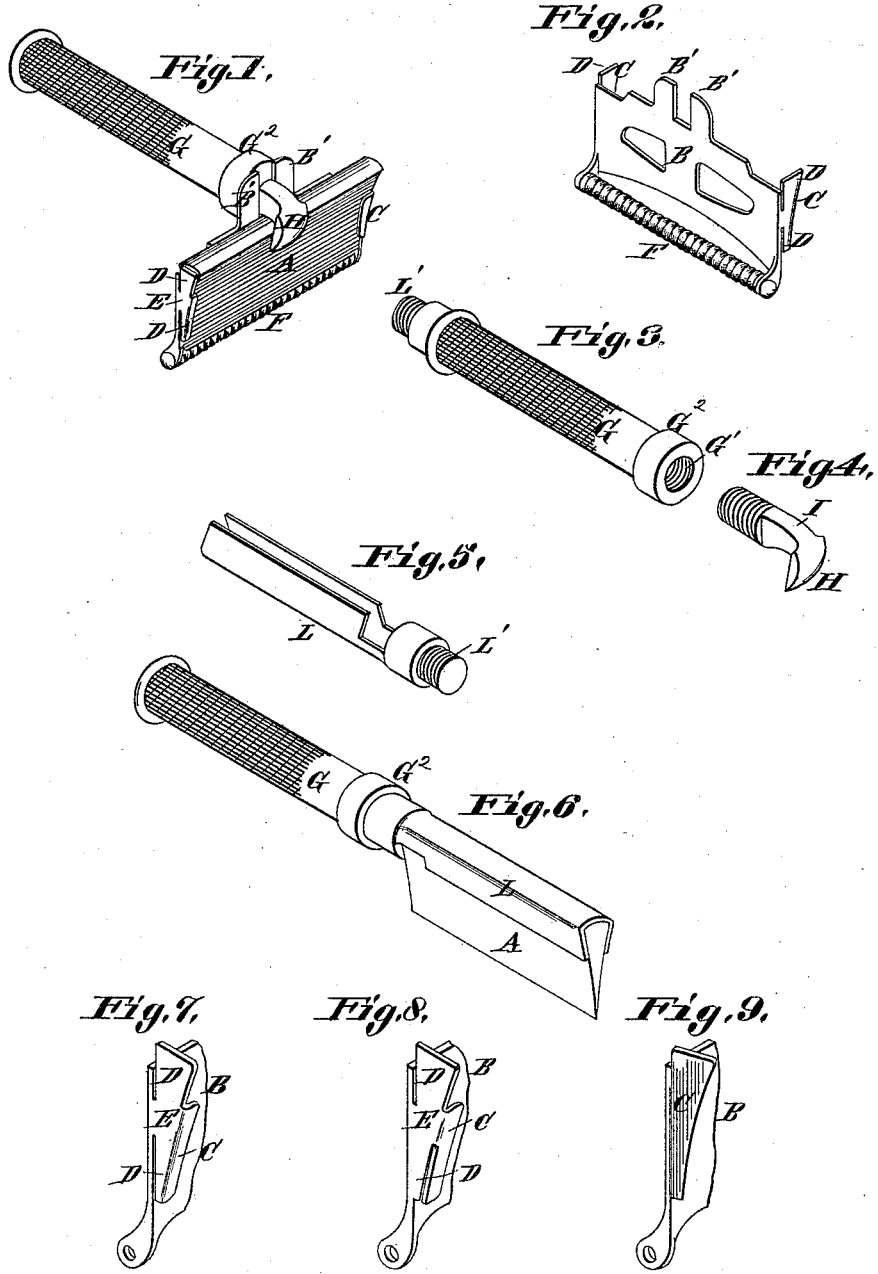
Attest:
Hervey Knight
Edward Stier
Inventor:
Gus. Rein,
By Knight Bros
Attys

UNITED STATES PATENT OFFICE.

GUSTAVUS REIN, OF ST. LOUIS, MISSOURI.

SAFETY-RAZOR.

SPECIFICATION forming part of Letters Patent No. 358,751, dated March 1, 1887.

Application filed October 23, 1886. Serial No. 217,046. (No model.)

*To all whom it may concern:*

Be it known that I, GUSTAVUS REIN, of the city of St. Louis, in the State of Missouri, have invented a certain new and useful Improvement in Safety-Razors, of which the following is a full, clear, and exact description, reference being had to the accompanying drawings, forming part of this specification, and in which—

Figure 1 is a perspective view of my improved razor. Fig. 2 is a perspective view of the blade-supporting plate. Fig. 3 is a perspective view of the handle removed. Fig. 4 is a perspective view of the blade-dog removed from the handle. Fig. 5 is a perspective view of the blade-holder for use in sharpening the blade. Fig. 6 is a similar view showing the blade in place in the holder and the holder secured to the handle. Fig. 7 is an enlarged detail perspective view of the blade-supporting plate. Fig. 8 is a similar view slightly modified, and Fig. 9 is a similar view showing still another modification.

My invention relates to certain improvements in safety-razors; and it consists in features of novelty hereinafter fully described, and pointed out in the claims.

Referring to the drawings, A represents the blade supported by a plate, B, to which it is held by end lugs or projections, C, on the plate, that grasp the ends of the blade, as shown in Fig. 1. These projections are preferably slit or cut at D, which disconnects them from the plate B at these points, and only leaves them united to the plate for a short distance at E. The object of these cuts is to allow for the adjustment of the blade relative to the guard-roller as it becomes worn. Thus, when the blade is put in it will be held by the stop C at the proper place, and as it becomes worn the stops will yield, owing to the cuts D, to pressure brought to bear upon the blade, and allow the latter to be forced down farther to bring its cutting-edge in the proper relation to the guard-roller.

Another reason, in addition to the one mentioned, for slotting the lugs on top is that it gives a spring to them by which they take such a hold of the blade as to retain it in place on the plate when the dog is removed and before it is applied.

In Figs. 1, 2, and 7 I have shown the cuts D between the stop-lugs and the plate B. In Fig. 8 I have shown the upper cut D at this point and the lower cut at the outer corner of the stop shown in this figure. In Fig. 9 the modification that is shown consists in placing the stops at an incline to the plane of the plate B, which will yield outward when pressure is brought to bear on the blade and allow the downward adjustment of the latter.

F represents the guard-roller, which is provided with a number of circumferential grooves forming a series of annular rings, which assist in the use of the instrument by moving the lather and depressing the skin at intervals.

G represents the handle, which is secured to the blade and the supporting-plate in a cheap and novel method.

H represents a dog threaded to enter a socket, G', in one end of the handle G. This dog has a non-circular portion, I, between its head and the screw H, which fits between lugs B', extending upward from the plate B, and against one side of which an enlarged end, G², of the handle G bears, as shown in Fig. 1. The dog engages the blade, as shown in Fig. 1, and it will be understood that when the dog is placed over the blade with the neck I between the projections B', and the handle screwed up tight against the projections, the blade and handle will be held firmly connected to the plate B. When it is desired to disconnect the parts and remove the blade, it is only necessary to unscrew the handle slightly, when it (carrying the dog with it) can be moved upward away from the blade and its supporting-plate, and the blade is then free to be moved from the plate. This method of connecting the blade to the supporting-plate is simple, durable, and cheap, and is effective in holding the parts together.

L represents the holder in which the blade is placed, as shown in Fig. 6, to be sharpened. This is provided with a threaded neck, L', which may be screwed into the socket G' of the handle G by removing the dog H.

When the holder L is not in use, it may be inserted into the hollow handle from the rear end, the threaded neck L' projecting from the handle, as shown in Fig. 2.

I claim as my invention—

1. In a safety-razor, in combination with the plate having projections B', the handle and dog, the latter having a non-circular portion fitting between the projections on the plate, substantially as and for the purpose set forth.

2. In a safety-razor, the combination, with the blade, and plate in which the blade is held, of a handle constructed to have end-bearing upon said plate, and with a dog movable in the handle and having a lip engaging against the outer side of the blade, substantially as and for the purpose set forth.

3. The combination, in a safety-razor, of a blade, a plate upon which the blade rests, a handle having end-bearing against the plate, and a dog screwing in the handle and having a bent-over end or lip engaging against the side of the blade, substantially as set forth.

4. The combination, in a safety-razor, of the blade-holding plate B, having lugs B', the blade, a handle having a screw-threaded socket and constructed to have end-bearing against the side of the plate B, and a dog having a screw-threaded shank screwing into the socket of the handle and passing between the lugs B', and having a lip or claw engaging the outer side of the blade, substantially as and for the purpose set forth.

5. The combination, in a safety-razor, of the blade and a blade-holding plate having lips or lugs at its ends, said lips or lugs having slits forming spring-tongues for bearing against the blade, substantially as set forth.

6. The combination, in a safety-razor, of the blade and a blade-holding plate with lugs or lips C, engaging the ends of the blade, with slits D at top and bottom forming spring-tongues, the upper ones of which bear against the ends of the blade and check the removal of the blade from the plate, while the lower spring-tongues allow the edgewise adjustment of the blade and hold it firmly to the plate in any position, substantially as set forth.

GUSTAVUS REIN.

In presence of—
  GEO. H. KNIGHT,
  JOS. WAHLE.